J. BORN.
FRICTION WHEEL.
APPLICATION FILED APR. 1, 1911.
1,013,117.
Patented Jan. 2, 1912.
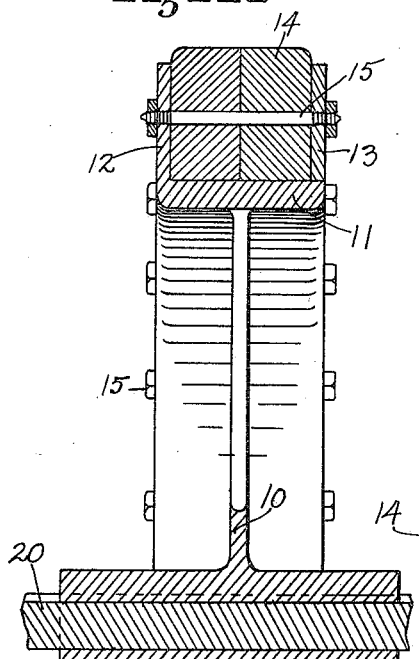
Fig-1-
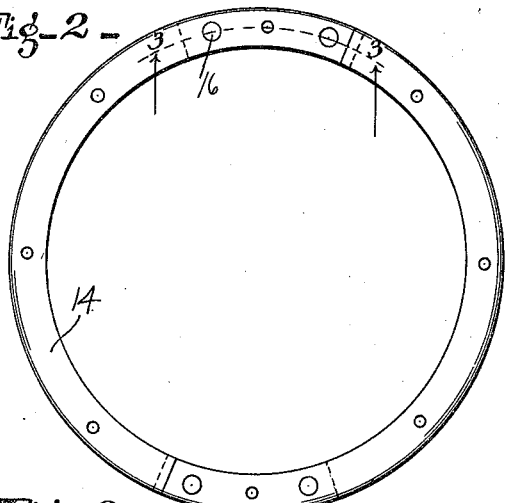
Fig-2-
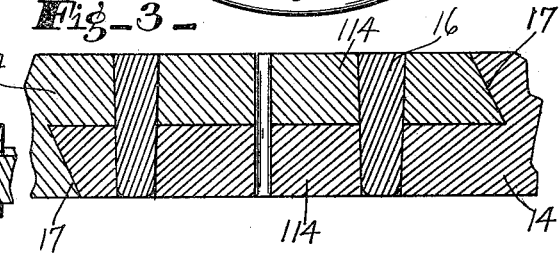
Fig-3-
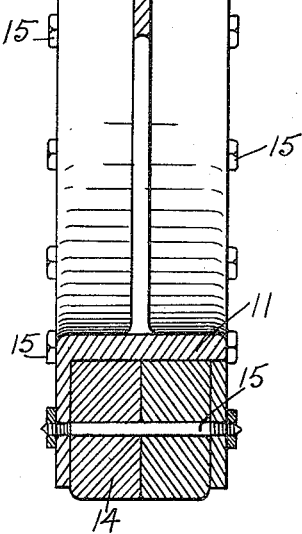
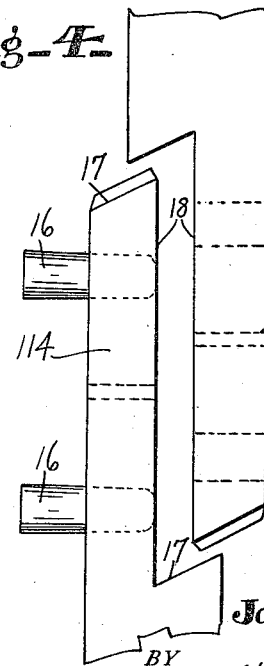
Fig-4-
WITNESSES:
E. A. Mayo
O. M. McLaughlin
INVENTOR.
Joseph Born.
BY
V. H. Lockwood
ATTORNEY.
COLUMBIA PLANOGRAPH CO., WASHINGTON, D. C.

UNITED STATES PATENT OFFICE.

JOSEPH BORN, OF INDIANAPOLIS, INDIANA, ASSIGNOR TO ROCKWOOD MANUFACTURING COMPANY, OF INDIANAPOLIS, INDIANA, A CORPORATION.

FRICTION-WHEEL.

1,013,117.   Specification of Letters Patent.   Patented Jan. 2, 1912.

Application filed April 1, 1911. Serial No. 618,445.

*To all whom it may concern:*

Be it known that I, JOSEPH BORN, a citizen of the United States, and a resident of Indianapolis, county of Marion, and State of Indiana, have invented a certain useful Friction-Wheel; and I do hereby declare that the following is a full, clear, and exact description thereof, reference being had to the accompanying drawings.

The object of this invention is to improve the construction of fiber wheels in friction transmission mechanism, whereby the fiber filler may be readily removable from or mounted in connection with the rim of a wheel. Heretofore, the fiber fillers for such friction wheels have been made continuous in one piece and inseparable so that when a filler wore out, it was extremely difficult and required considerable time and sometimes expense to remove the filler and to replace another in its place.

The essential feature of this invention consists in forming the annular filler of two substantially semi-circular sections with overlapping ends and means for securing the overlapping ends together, whereby the filler can be separated in its sections to remove it from the wheel or place it in the wheel in sections and then unite it.

The nature of the invention will be understood from the accompanying drawings and the following description and claims.

In the drawings Figure 1 is a central vertical section through one form of such friction wheel. Fig. 2 is a side elevation of the improved filler. Fig. 3 is a section on the line 3—3 of Fig. 2. Fig. 4 is an inside elevation of the ends of the two sections of the filler showing the overlapping parts ready to be united.

In detail the drawings herein for the purpose of illustrating the nature of this invention show one type of friction wheel 10 such as the usual driven wheel in friction transmission mechanisms of automobiles. The particular wheel herein shown has a rim 11 with an integral radial and downwardly extending side flange 12 and a separate flange 13 surrounding the rim at the other side so as to be parallel with the flange 12 and a filler 14 is secured between said flanges and to the flange 12 by bolts 15.

The filler is formed of paper fiber preferably, although this invention is not limited to the material of which the filler is formed and it is annular and divided into two sections, see Fig. 3. Each end of each section is provided with an extension or overlapping portion 114, each of which is one half of the width of the filler and they have holes through them, whereby they may be secured in place by dowel-pins 16. Each end of each section at the point where it is cut away to receive the overlapping end of the other section is dove-tailed or under-cut, as shown at 17, to receive the beveled ends of the overlapping portions 114 of the section. The dowel pins are preferably tapering somewhat so that when driven in, they will fit very tightly and tend to force the ends of the overlapping portion 114 very tightly against the abutting surface at 17 on the body of the filler. In making this sort of filler it is preferable that the entire annular filler be first made, substantially the same as heretofore, excepting that at two opposite points of the ring or filler as the layers are placed together above each other, a sheet of paper or fiber 18 of some sort is located, the paper or fiber being such as will readily separate or split and, therefore, very weak or rotten as compared with the fiber in the body of the filler. After the filler has thus been completely formed as of old, the filler is sawed in two at the points 17 for about half the thickness of the filler to the intermediate sheet of paper or the like 18 and then by a slight stroke of the hammer the two parts will separate, as shown in Fig. 4. This makes the rim of the filler homogeneous and very strong and yet permits it to be formed of two sections, as stated.

In mounting a completed annular filler on the friction wheel 10, it is necessary to take the wheel 10 entirely off of the shaft 20, which is a difficult thing to do, especially for a person who is not an expert mechanic. But these sections can be placed on said wheel without its removal from the shaft. This is done by placing the two sections on each side of the shaft 20, then uniting them with the dowel-pins 16 and slipping them over the rim 11 of the wheel and then inserting the bolts 15 through the flange 12 and the filler and putting the flange 13 in place and securing the nuts on the bolts. The fillers are removable by taking off the nuts and slipping the filler off of the rim and then separating the two sections by driving the dowel-pins half way out, as shown in Fig. 4.

I claim as my invention:

1. A fiber filler for friction wheels consisting of two substantially semi-circular sections with overlapping ends, the overlapping ends being substantially half the thickness of the filler and having transverse holes therethrough, and tapering dowel-pins insertible through the overlapping ends for securing them together.

2. A fiber filler for friction wheels consisting of two substantially semi-circular sections with overlapping ends, the overlapping ends being substantially half the thickness of the filler and beveled at their extreme ends so as to form an acute angle, and each end of each section being correspondingly recessed to receive such beveled overlapping ends and having holes extending through said overlapping ends, and tapering dowel-pins extending through said holes.

In witness whereof, I have hereunto affixed my signature in the presence of the witnesses herein named.

JOSEPH BORN.

Witnesses:
G. H. BOINK,
O. M. McLAUGHLIN.